No. 856,698. PATENTED JUNE 11, 1907.
E. F. HARTLOVE.
CAN SOLDERING MACHINE.
APPLICATION FILED FEB. 2, 1907.
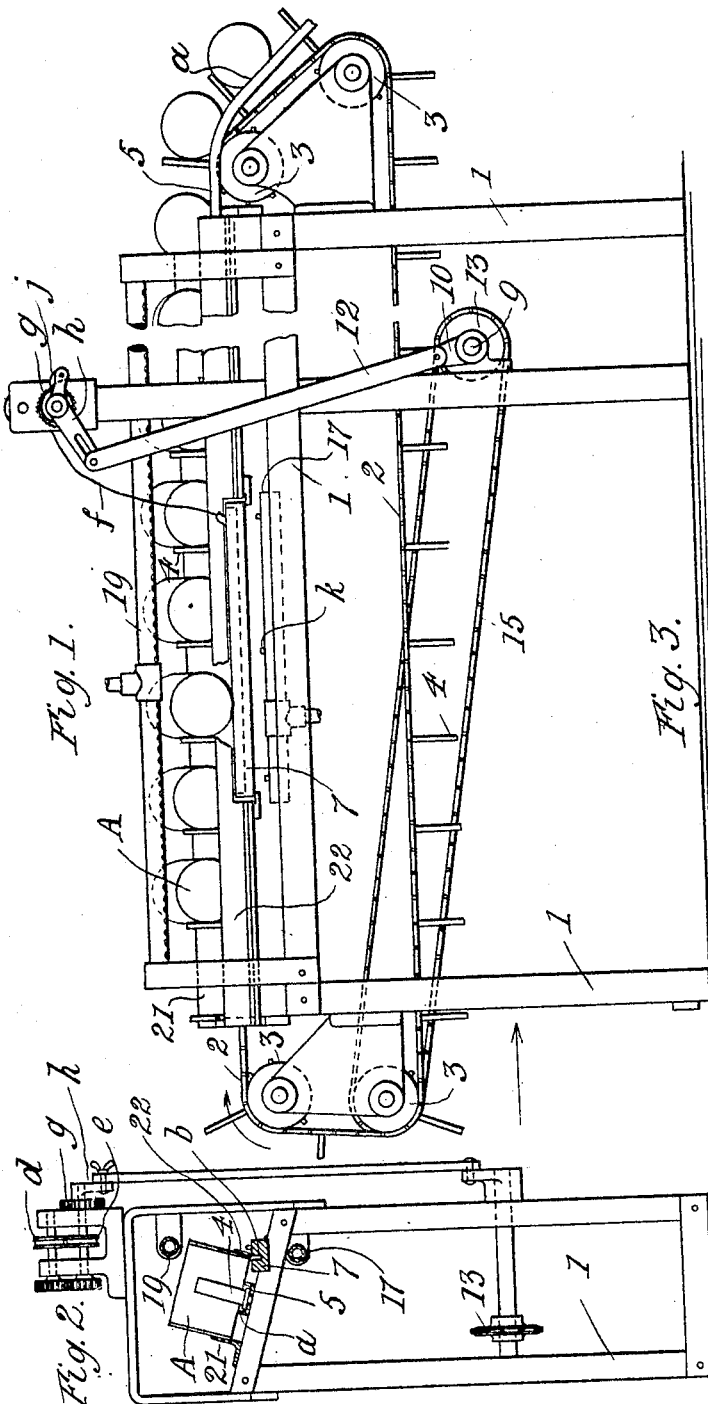
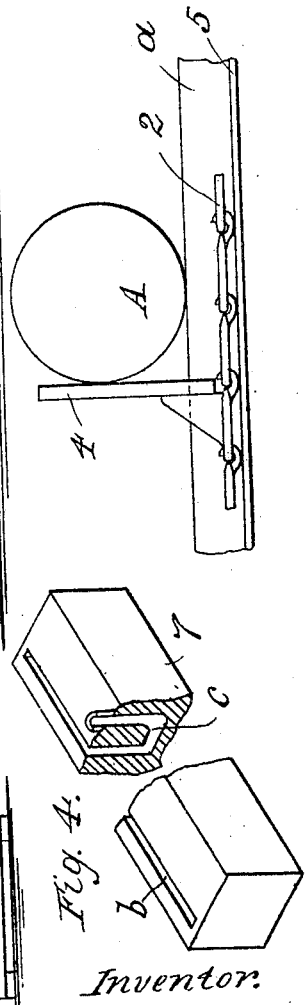
Witnesses:
Elwood Bozman
H. Findley French.
Inventor:
Emory F. Hartlove,
by G. H. & W. T. Howard
Attys.

UNITED STATES PATENT OFFICE.

EMORY F. HARTLOVE, OF BALTIMORE, MARYLAND.

CAN-SOLDERING MACHINE.

No. 856,698.  Specification of Letters Patent.  Patented June 11, 1907.

Application filed February 2, 1907. Serial No. 355,348.

*To all whom it may concern:*

Be it known that I, EMORY F. HARTLOVE, of the city of Baltimore and State of Maryland, have invented certain Improvements in Can-Soldering Machines, of which the following is a specification.

This invention relates to certain improvements in soldering machines whereby the heads are soldered to the bodies of cans, as will hereinafter fully appear.

In the further description of the said invention which follows, reference is made to the accompanying drawing forming a part hereof and in which,—

Figure 1 is a partly sectional side elevation of such parts of the improved machine as embody the present invention, or are intimately associated therewith, and Fig. 2 an end view of the same, except that certain parts are removed, and looking in the direction indicated by the arrow. Fig. 3 is an enlarged view of certain parts of the mechanism whereby the cans are rolled along the machine in the soldering operation, and Fig. 4 an enlarged isometric view of a solder-holding bath forming an element of the machine, and which is illustrated as broken to show the interior.

Referring now to the drawing, 1 is the frame of the machine and 2 an endless sprocket chain extending over the sprocket wheels 3, as shown in Fig. 1. The chain 2 is provided with carriers 4 which serve to give movement to the cans in the soldering operation hereinafter described.

5 is a flanged rail which supports a portion of the upper lay of the sprocket chain 2, the flanges $a$ of which extend above the chain as best shown in Fig. 3.

By reference to Fig. 2, it will be seen that the flanged rail 5 is in an inclined position, and in consequence, the cans represented by A, when resting on the flanges $a$ assume the same angle of inclination as the rail; but the said rail where it projects beyond the frame 1 at the delivery end of the machine is not inclined, and the cans therefore are delivered in a horizontal position. It will also be seen that owing to the edges of the flanges $a$ being above the sprocket chain that device of itself when in motion, communicates no movement to the cans, they being driven entirely by the carriers 4; and that the friction between the cans and the flanges $a$ causes the cans to rotate on their axes.

7 is a soldering block having a groove $b$ therein to hold molten solder, and a supply passage $c$ leading from the groove $b$ to the upper surface of the block, into which solder in the form of wire is fed. Any appropriate means for feeding the wire solder to the supply passage $c$ may be employed, and the mechanism illustrated in the drawing consists of grooved rolls $d$ and $e$ which are intermittently rotated and draw the solder wire denoted by $f$ from a source of supply not shown. The shaft of the roll $e$ is provided with a tight ratchet wheel $g$, and a loose crank-arm $h$ carrying a pawl $j$, and the arm receives a vibratory movement from the driving shaft 9 through the medium of the crank 10 and the connecting rod 12. The driving shaft 9 also communicates a constant rotary movement to a sprocket wheel not shown on the shaft of one of the sprocket wheels 3, by means of the sprocket wheel 13 and the chain 15. The soldering block 7 before referred to, is heated by flames from burners $k$ which extend from a gas reservoir pipe 17; and the cans are heated where the same are to be soldered, from a similar gas pipe 19 having minute perforations in its lower side which constitute burners. The width of the groove $b$ in the soldering block 7 is such as to admit thereto little more than the flange of the can heads, thus preventing the distribution of solder above the joint. The contracted width of the groove also reduces the area of exposed molten solder, and the consequent oxidation of that metal.

21 and 22 are guard rails to keep the unsoldered joint of the cans in the groove $b$, during the passage of the cans over the soldering block 7, and the rail 21 is made adjustable with reference to the rail 22 to suit cans of various sizes. Supposing the machine to be in operation, with the sprocket chain 2 moving in the direction indicated by the curved arrow in Fig. 1, and cans are delivered to the said chain, and upon passing onto the flanges $a$ of the rail 5 assume an inclined position between the guard rails 21 and 22, and are rolled along the machine. In the passage of the cans as described the unsoldered heads traverse the groove $b$, and the joints are soldered.

I claim as my invention:

1. In a soldering machine, an endless sprocket chain having carriers thereon, an inclined rail to support the upper lay of the chain, the said rail having flanges which extend above the sprocket chain, and upon which the cans bear when moved longitudinally of the machine by the carriers, and means to heat the cans during their movement, combined with a soldering block having a groove for solder, and means to heat the soldering block, substantially as specified.

2. In a soldering machine, an endless sprocket chain having carriers thereon, an inclined rail to support the upper lay of the chain, the said rail having flanges which extend above the sprocket chain, and upon which the cans bear when moved longitudinally of the machine by the carriers, and means to heat the cans during their movement, combined with a soldering block having a groove for solder and a passage leading from the groove into which solder may be fed, and means to heat the soldering block, substantially as specified.

EMORY F. HARTLOVE.

Witnesses:
   THOMAS G. HULL,
   WM. T. HOWARD.